United States Patent [19]

Stout et al.

[11] Patent Number: 4,931,319

[45] Date of Patent: Jun. 5, 1990

[54] METHOD FOR APPLYING A WATER REPELLANT COMPOSITION WITH A WATER CARRIER

[75] Inventors: Mike F. Stout, Oklahoma City; Dean Brunken, Edmond, both of Okla.

[73] Assignee: Advanced Chemical Technologies Company, Oklahoma City, Okla.

[21] Appl. No.: 214,174

[22] Filed: Jul. 1, 1988

[51] Int. Cl.$^5$ .............................................. B05D 1/02
[52] U.S. Cl. .................................. 427/421; 427/393.4; 427/393.6; 428/540; 528/10
[58] Field of Search ....................... 427/384, 387, 393.4, 427/393.6, 421; 528/10; 428/540

[56] References Cited

U.S. PATENT DOCUMENTS

| | | | |
|---|---|---|---|
| 2,683,674 | 7/1954 | Hatcher et al. | 117/123 |
| 3,772,065 | 11/1973 | Seiler | 106/2 X |
| 3,819,400 | 6/1974 | Plankl et al. | 117/54 |
| 4,273,813 | 6/1981 | Meddaugh | 427/387 |
| 4,342,796 | 8/1982 | Brown et al. | 427/136 |
| 4,478,911 | 10/1984 | Price | 528/10 X |
| 4,648,904 | 3/1987 | DePasquale et al. | 106/2 |
| 4,781,950 | 11/1988 | Giesing et al. | 427/136 X |

OTHER PUBLICATIONS

Exhibit A, brochure "Permanent Weatherproofing for Concrete and Masonry".
Exhibit B, brochure "Sil-ACT Alkyltrialkoxy Silane".
Exhibit C, brochure "D.K. Hydroblast, Inc."
Exhibit D, brochure "In-Line Trailer Sprayers 400-500 Gallon".
Exhibit E, brochure "Lawn & Garden Gallon Sprayers, Power Washers".
Exhibit F, brochure "Nursery, Greenhouse and Lawn Sprayers, 3 and 5 gpm".
Exhibit G, Advertisement "Stainless Steel/Steam".

Primary Examiner—Michael Lusignan
Attorney, Agent, or Firm—Dunlap, Codding, Peterson & Lee

[57] ABSTRACT

A method for treating siliceous and carbon central structures with a water repellant composition wherein an effective amount of water repellant composition is dispersed in water and the mixture then is applied in a continuous process after the mixing to the structure to be treated. The methods also contemplate increasing the depth of penetration of a silane into the structure to be treated by applying subsequent applications of silane to the structure to be treated.

38 Claims, 1 Drawing Sheet

METHOD FOR APPLYING A WATER REPELLANT COMPOSITION WITH A WATER CARRIER

FIELD OF THE INVENTION

The present invention relates generally to methods for applying water repellant compositions to structures and, more particularly, but not by way of limitation, to a method for applying a water repellant composition to a structure utilizing a water carrier.

DESCRIPTION OF THE PREFERRED EMBODIMENTS

Figure 1:
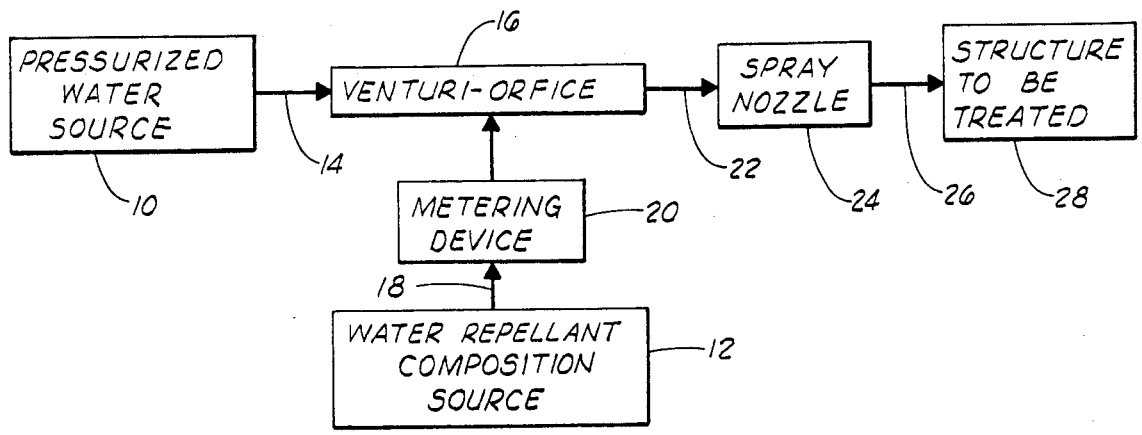
FIG. 1 is a schematic representation of one embodiment of the method of the present invention.

The present invention provides a method for treating siliceous structures and or carbon central structures with a water repellant composition utilizing a water carrier. In accordance with the method of the present invention, an effective amount of water repellant composition is mixed with water and the resulting dispersion of water repellant composition and water is applied to the structure to be treated in a continuous process.

The water repellant compositions used in the present invention can be selected from commercially available water repellant compositions or may comprise a silane or siloxane or combinations thereof (sometimes referred to herein as the active ingredient).

The silane is represented by the general structure or formula:

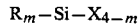

wherein
  m is 0 or 1 or 2 or 3;
  X is a halogen, hydroxyl, R or $R_1$
  R is an alkyl group containing from 1 to about 30 carbon atoms, hydrogen, an alkoxy group, an alkenyl group, an aryl group, a cycloalkyl group, a cycloalkenyl group, an arylalkyl group, or an arylalkenyl group, and $R_1$ being an alkyl group containing from 1 to about 8 carbon atoms, a hydroxyalkyl group, or an alkoxyalkyl group.

The siloxane is represented by the general structure or formula;

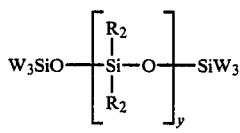

wherein $R_2$ is the same or different moiety of an alkyl containing from 1 to about 30 carbon atoms, an alkenyl containing up to about 8 carbon atoms, an aryl or a cycloalkyl, cycloalkenyl, arylalkyl or arylalkenyl wherein the cyclo substituent contains from about 4 to about 8 carbon atoms, the alkyl substituent contains from 1 to about 8 carbon atoms, the alkenyl substituent contains up to about 8 carbon atoms, and y is an integer of from 2 to about 100; and wherein W is a halogen, hydroxyl, alkyl, aryl or alkoxy.

The water repellant composition may be a substantially pure silane or siloxane or combinations thereof, or the water repellant composition may be a silane or siloxane or combinations thereof in a hydrocarbon, alcohol or other solvent. In one preferred embodiment of the present invention, the water repellant composition is a pure silane or siloxane, not in a hydrocarbon or alcohol or other solvents such as glycol, so the present invention provides a means of applying a silane or siloxane to a structure to be rendered water repellant utilizing a water carrier thereby eliminating the use of hydrocarbon, alcohol or other solvents which may not be desirable in some applications.

A catalyst may be added to the water repellant composition. Effective catalyst can be titanium acetylacetonate or dibutyl tin dilaurate. It has been found that the active ingredient in a pure form or in a medium and a catalyst of only dibutyl tin dilaurate is effective for treating concrete or masonry and the amount of the active ingredient can be substantially reduced. However, this composition was not as effective for treating carbon central structures.

Further, it has been found that the active ingredient in a pure form or in a medium and a catalyst of only titanium acetylacetonate is effective for treating carbon central structures. However, this composition was not as effective for treating siliceous structures.

However, a water repellant composition comprising the active ingredient in a pure form or in a medium and a catalyst of dibutyl tin dilaurate and titanium acetylacetonate has been found to be effective in treating siliceous structures as well as carbon central structures to render such structures water repellant.

The catalyst, dibutyl tin dilaurate and titanium acetylacetonate, can be present in the water repellant composition in a range from less than about one percent (1%) to about twenty-five percent (25%) by weight of the active ingredient. Solutions or emulsions or dispersions containing as little as about one (1%) to about ten (10%) by weight of the active ingredient have been found to be effective for treating siliceous and carbon central structures for rendering such structures substantially water repellant.

The present invention is useful for treating siliceous structures and or carbon central structures having available hydroxy (OH) groups. Siliceous structures includes such structures as commonly referred to as concrete and masonry. Carbon central structures as used herein means structures that are characterized by a central carbon atom as opposed to a central silicon atom in siliceous structures, and which have available hydroxy groups. These carbon central structures can be either organic such as leather, paper or wood, or inorganic such as limestone or dolomite. The term "siliceous structure and or carbon central structure" as used herein includes soil since the present invention also is useful for treating soil for soil stabilization and adobe or ram earth structures because the present invention is useful for treating adobe or ram earth bricks for water repellancy.

As used herein "medium" means a carrier such as alcohol, water, hydrocarbon or glycol which may be mixed with the water repellant composition. In the present invention, the water repellant composition is mixed with or dispersed in water and applied to the surface to be treated, and the water repellant composition to be dispersed in the water carrier may be essentially pure or mixed with a medium, as that term "medium" is used herein. The present invention is not limited to any particular medium.

As illustrated in FIG. 1, the method of the present invention is carried out by providing a pressurized water source 10 and a water repellant composition source 12. A pressurized water stream 14 is passed from the pressurized water source 10 into a venturi-orfice 16. A water repellant composition stream 18 is passed from the water repellant composition source 12 through a metering device 20 into the venturi-orfice 16.

The metering device 20 meters the amount of water repellant composition being passed from the water repellant composition source 12 into the venturi-orfice 16. The water in the water stream 14 is mixed with the water repellant composition in the water repellant composition stream 18 in the venturi-orfice 16 and the mixture comprising the water and the water repellant composition is passed from the venturi-orfice 16 in a stream 22 and through a spray nozzle 24. The mixture comprising the water repellant composition and water is passed from the spray nozzle 24 in a stream 26 onto the structure to be treated designated in FIG. 1 by the reference numeral 28.

The venturi-orfice 16 utilizes the pressure in the pressurized water source 10 to pump or suck the water repellant composition from the water repellant source 12 through the metering device 20. The venturi-orfice 16 may be a typical venturi structure or may simply comprise an orfice. The venturi-orfice 16 also functions to facilitate the thorough mixing of the water and the water repellant composition. The venturi-orfice 16 also may function as the spray nozzle 24 and, in this instance, the spray nozzle 24 may be eliminated.

It is important to thoroughly mix the water and the water repellant composition prior to the mixture being applied to the structure to be treated in order to effectively treat the structure to be treated 28 with water repellant composition. The water serves as a carrier to carry the water repellant composition to the structure to be treated and the water functions to facilitate the penetration of the water repellant composition into the structure to be treated. The water acts as a dilutant to disperse the water repellant composition to substantially prevent co-condensation of the water repellant composition prior to the water repellant composition being applied to the structure to be treated 28; that is, the silane, siloxane or other water repellant composition molecules are highly dispersed in the water and therefore the tendency is for the molecules to react with or adhere to the substrate to be treated rather than with one another to form polymers or otherwise coalesce.

In one embodiment, the pressurized water source 10 may be the pressurized water source commonly available at water outlets at commercial, residential or other structures. In this embodiment, the pressurized water stream 14 is carried to the venturi-orfice 16 through a common garden hose. There are various and numerous commercially available devices which are connectable to the pressurized water source at commercial, residential or other structures and which include a venturi-orfice such as the venturi-orfice 16 and a siphon tube connected to the venturi-orfice 16 wherein the siphon tube is disposable in a container containing a liquid such as the water repellant composition for passing the water repellant composition stream 18 to the venturi-orfice 16.

These commercially available devices or dispensers also commonly include metering means such as the metering device 20 for metering the amount of water repellant composition to be passed to the venturi-orfice 16. One commercially available device which might be used in the system illustrated in FIG. 1 is commercially available from Gilmore Manufacturing Company of Summerset, Pennsylvania and is referred to by their designation "insecticide and fertilizer sprayer with metering dial". In this embodiment, the present invention contemplates a method for applying water repellant composition to the structure to be treated utilizing a commercially available sprayer connected to a garden hose which is connected to the pressurized water source at a commercial or residential or other structure.

Nothing stated herein should be interpreted to mean or infer that commercially available sprayers have been used in the past for applying water repellant composition. Such sprayers commonly have been used for applying herbacides, insectides or fertilizers to living foilage.

Figure 2:
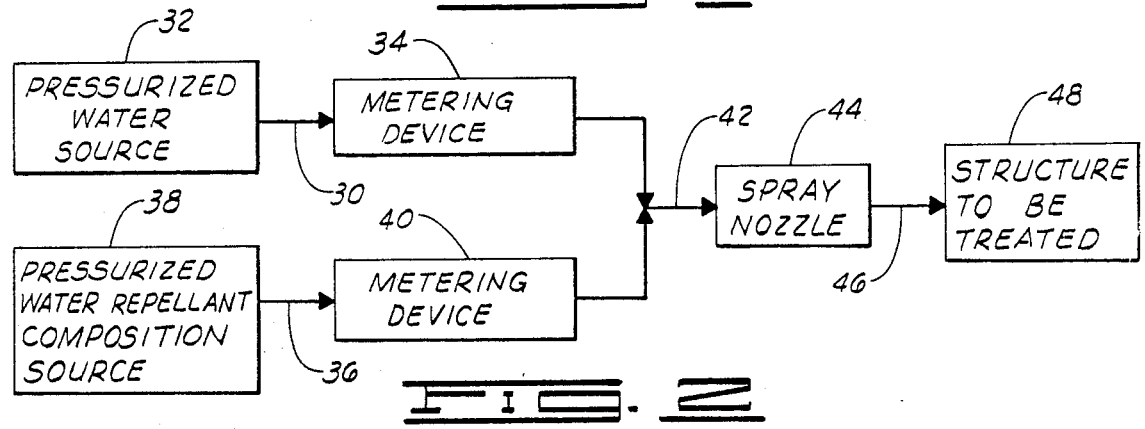
FIG. 2 is a schematic representation of a system showing one other embodiment of the method of the present invention.

Schematically shown in FIG. 2 is one other embodiment of the method of the present invention. As shown in FIG. 2, a water stream 30 is passed from a pressurized water source 32 through a metering device 34. pressurized water repellant composition stream 36 is passed from a pressurized water repellant composition source 38 through a metering device 40. The pressurized water stream 30 and the pressurized water repellant composition stream 36 are combined for mixing the water repellant composition with the water, and a combined water and water repellant composition stream 42 is passed through a spray nozzle 44. A combined water and water repellant composition stream 46 is passed from the spray nozzle 44 onto a structure to be treated 48.

Figure 3:
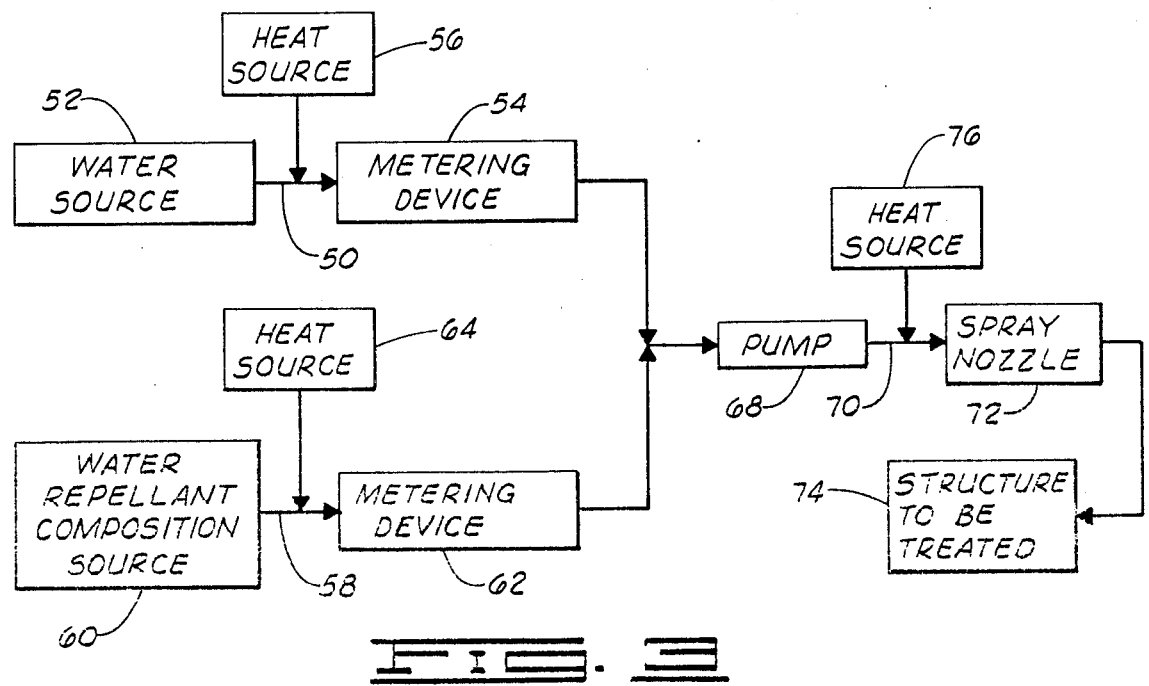
FIG. 3 is a schematic representation of yet another embodiment of the method of the present invention.

One other embodiment illustrating the method of the present invention is shown in FIG. 3 wherein a water stream 50 is supplied from a water source 52 through a metering device 54. Heat from a heat source 56 is applied to the water stream 50 for heating the water stream 50 which may be desired in some applications. A water repellant composition stream 58 is supplied from a water repellant composition source 60 through a metering device 62. Heat from a heat source 64 is applied to the water repellant composition stream 58 for heating the water repellant composition.

The water supply stream and the water repellant composition stream are passed into each other and mixed to some degree to form a mixture of water and water repellant composition stream 66 which is supplied to the inlet of a pump 68. The pump 68 pumps the mixture of water and water repellant composition and outputs a dispersion of water and water repellant composition stream 70 which is passed through a nozzle 72 and applied to a structure to be treated 74. In addition to providing a source of energy for pumping the mixture of water and water repellant composition, the pump 68 also functions to complete the thorough mixing of the water and the water repellant composition prior to the mixture being applied to the structure to be treated 74.

As shown in FIG. 3, heat from a heat source 76 is applied to the mixture stream 70 for heating the mixture stream 70 prior to the mixture stream 70 being applied to the structure to be treated which may be desired in some instances.

It should be noted that it may be desirable in some applications to eliminate any or all of the heat sources 56, 64 or 76. For example, only the heat source 76 may be required in some applications or only the heat source 56 may be required in some applications or only the heat source 56 and 64 may be required in some applications.

The term "water source" is used herein in connection with the water sources 10, 32 and 52 shall include steam since in some instances it may be desirable to use steam as the medium for mixing with the water repellant composition to be applied to the structure to be treated.

In its simplest form, the present invention comprises adding a portion of water repellant composition and a portion of water to a container, agitating the container, and immediately pouring or spraying the resulting dispersion onto the surface to be rendered water repellant.

In one test, five cupcake shaped concrete blocks were treated as follows: Specimen 1 was treated by putting 3 ml of isobutyltrimethoxy silane into a 100 ml graduated cylinder. The cylinder then was filled with tap water (97 ml of water), agitated vigorously, and the resulting dispersion was poured immediately onto Specimen 1.

Specimens 2 through 5 were treated in the same manner with increasing silane concentrations in the dispersion. About 5 hours later, the 5 specimens were split in half, and the fractured face was wetted for visual observation of the silane penetration depth. All 5 specimens appeared about the same with about $\frac{1}{2}$ inch of silane penetration as shown in Table I below:

TABLE I

| SPECIMEN NUMBER | AMOUNT OF SILANE (ml) | AMOUNT OF TAP WATER (ml) | PENETRATION DEPTH (inches) |
|---|---|---|---|
| 1 | 3 | 97 | $\frac{1}{2}$ |
| 2 | 6 | 94 | $\frac{1}{2}$ |
| 3 | 9 | 91 | $\frac{1}{2}$ |
| 4 | 12 | 88 | $\frac{1}{2}$ |
| 5 | 15 | 85 | $\frac{1}{2}$ |

In another test, one cupcake shaped concrete specimen was treated by pouring 5 ml of N-octyltriethoxy silane into a 100 ml of tap water, and vigorously agitate. The resulting dispersion immediately was poured onto the specimen. This specimen was split and visually checked for depth of penetration. It appeared that the dispersion had penetrated into the specimen to depth of about $\frac{1}{4}$ inch.

In another test, a Gilmor garden spray unit of the type described before was used to apply one pint of isobutyltrimethoxy silane containing about 2% dibutyl tin diluarate to about 400 square feet of concrete and brick surface. The spray unit's venturi meter was set to mix the silane in the water at about 5% to about 6% silane by volume. The treated surface became water repellant immediately and showed a vivid water bead effect and high degree of water repellancy within about 1 hour or less.

In another test, a 100 ml graduated cylinder was filled to about the 10 ml mark with isobutyltrimethoxy silane and then about 1 ml of titanium acetyl acetonate was added. This water repellant composition was dispersed in water by adding 89 ml of tap water and agitating vigorously. The dispersion immediately was poured onto a piece of rough cedar wood. The cedar became water repellant a few hours later.

Where the mixture of water and water repellant composition is applied under pressure either because the water source is pressurized or because the water repellant composition source is pressurized or both or because the mixture is pumped and outputted under pressure, it may be possible to eliminate the cleaning of the surface of the structure to be treated utilizing the process of the present invention. The pressurized mixture of water and water repellant composition applied to the structure to be treated simultaneously would clean the surface of the structure to be treated sufficiently to permit the water repellant composition to migrate into the structure to be treated. It is not necessary that the surface of the structure to be treated be cleaned in an ordinary since, but rather that the debris be moved so that the water repellant composition will have access to the surface of the structure to be treated for proper application.

In accordance with the present invention, the mixture of water and water repellant composition is applied to the structure to be treated in a continuous process about immediately after mixing the water and the water repellant composition. In some instances, depending on the length of conduits or hoses, various times will elapse between the mixing of the water and the water repellant composition and the applying of the mixture to the structure to be treated. The exact time is not significant as long as the mixture is applied in a substantially continuous process after the mixing of the water and the water repellant composition at the site. The mixture of water and water repellant composition is applied to the structure to be treated prior to substantial co-condensation of the water repellant composition. In other words, the silane or siloxane, or other water repellant composition molecules are highly dispersed in the water and therefore the tendency is for the silane or other molecules to react with or adhere to the substrate to be treated rather than with one another to form polymers or otherwise coalesce. In most applications, it is contemplated that the mixture or dispersion of water and water repellant composition will be applied to the structure to be treated within a time range from about less than five seconds to about less than five minutes.

In some applications, the water and the water repellant composition may be mixed at the site, temporarily stored in a chamber at the site and subsequently applied to the structure to be treated and, in this instance, this is considered to be applied in a continuous process at the site. The use of the term "in a continuous process at the site" as used herein is intended to distinguish the present process from applications where water repellant composition and water are mixed in some manner, stored in containers and shipped to the site for subsequent application to the structure to be treated. The methods of the present invention do not include or encompass the method just described in the last preceding sentence.

Utilizing a silane of the structure described before, it also has been discovered that the depth of penetration of the silane into the structure to be treated can be increased by applying subsequent coats of the silane to the surface of the structure to be treated. In this application, the silane is applied to the surface of the structure to be treated and after waiting at least a few minutes for the structure to appear dry, a second coat of silane is applied to the surface of the structure to be treated. Subsequence coats can be applied in a similar manner for still further increasing the depth of penetration of the silane into the structure to be treated.

This technique of increasing the depth of penetration can be used in conjunction with the methods described before in connection with FIGS. 1, 2 and 3 and this technique of increasing the depth of penetration by applying subsequent coats of the silane to the surface of the structure to be treated can be used in connection with applying either pure silane or silane in solution with a medium without the water mixing step described before in connection with FIGS. 1, 2 and 3, or the water mixing step may be utilized for the first application for simultaneously cleaning the surface of the structure to be treated.

In one test, with respect to the increasing of the depth of penetration of the silane, six uniform samples of concrete identified as $M_1$, $M_2$, $M_3$, $M_4$, $M_5$ and $M_6$ were treated in the following manner:

A. Samples $M_1$ and $M_2$ were dipped in an alktrialkoxysilane in a 40% solution with isopropyl alcohol. The samples $M_1$ and $M_2$ were not further treated with this silane solution.

B. Samples $M_3$, $M_4$, $M_5$ and $M_6$ were retreated about one week later by flooding the dry surface of the samples $M_3$, $M_4$, $M_5$ and $M_6$ with the 40% silane solution. Samples $M_3$ and $M_4$ were not further treated.

C. The samples $M_5$ and $M_6$ were retreated a third time after a few minutes lapse of time between the second treatment of these samples $M_5$ and $M_6$.

All of the samples, $M_1$, $M_2$, $M_3$, $M_4$, $M_5$ and $M_6$ were split open and the split surfaces wetted to visually check the depth of penetration. The depth of penetration was visually checked on Day 1 and again on Day 4, four days later, and the results of these tests are indicated in Table I below.

TABLE I

| Sample | Depth of Penetration (Inches) Day 1 | Average Inches | Depth of Penetration (Inches) Day 4 | Average Inches |
|---|---|---|---|---|
| $M_1$ | 5/32 | 7/64 | 3/16 | 3/16 |
| $M_2$ | 2/32 |  | 3/16 |  |
| $M_3$ | 3/16 | 7/32 | ¼ | ¼ |
| $M_4$ | 4/16 |  | ¼ |  |
| $M_5$ | 3/8 | 3/8 | 3/8 | 3/8 |
| $M_6$ | 3/8 |  | 3/8 |  |

The differences between the depths of penetration shown in Table I above for Day 1 and Day 4 for the same sample probably were due to the fact that the treatment became more visible after a lapse of time following the initial water wetting for visable inspection. In any event, the tests illustrated in FIG. 1 above do show that subsequent applications of silane to the surface to be treated did significantly increase the depth of penetration of the silane into the surface of the structure to be treated.

In one embodiment, a steam cleaning unit is fitted with a chemical feed system of either a pump or venturi type commonly used to supply detergents or acid/alkali solutions for cleaning masonry structures such as reinforced concrete bridge decks. The steam cleaning unit may be of the type described in U.S. Pat. No. 3,819,400, issued to Plankl, et al., June 25, 1974, for example. In this instance, the chemical being fed into the steam stream is the water repellant composition. The unit thus equipped is used to treat a dirty reinforced concrete bridge deck by forcing the water repellant composition into the concrete to a depth of about ⅜ of an inch or more, using the heat and pressure of the steam jet to move the dirt, oils, films and other contaminants while causing the water repellant composition to rapidly migrate into the concrete structure. After the water repellant composition has reacted, the outer ⅜ of an inch of the structure becomes extremely dry due to its inherent hydrophobic nature imparted by the water repellant composition. A number of applications of solvent (medium) solutions of silane water repellant composition can then be sprayed onto the cleaned (pores opened) and hydrophobically dry surface to facilitate penetration possibly down to and below the reinforcing steel. In this manner, a concrete bridge deck can become permanently resistant to steel corrosion and salt and water and freeze thaw attack. Existing methods require expensive cleaning followed by heavy coatings with water repellant material. These existing methods are limited by the wear resistance of the coating. The cleaning and traffic control presently accounts for most of the treatment expense. The present invention will provide much longer lasting and more effective protection for the same or lesser cost.

In another embodiment, a Gilmour sprayer of the type described before can be used to apply a 3% to 5% dispersion of silane in water providing substantial depth of penetration and long term protection, followed by a second treatment with about 1% to about 2% dispersion or less of siloxane in water to improve the appearance or beading effect (contact angle). The second treatment might be repeated every few years to revitalize the beading effect.

Changes may be made in the steps or in the sequence of steps of the methods described herein without departing from the spirit and scope of the invention as defined in the following claims.

We claim:

1. A method for treating siliceous and or carbon central structures at a site with a water repellant composition comprising the steps of:

mixing an effective amount of water repellant composition with water to obtain a dispersion of water and water repellant composition;

applying the dispersion of water repellant composition and water to the structure in a continuous process at the site immediately within about 5 seconds after the water repellant composition and the water are mixed; and wherein the water repellant composition comprises a silane or siloxane or combinations thereof and, wherein the silane has the general formula:

$$R_m-Si-X_{4-m}$$

wherein m is 0 or 1 or 2 or 3;

X is a halogen, hydroxyl, R or $R_1$;

R is an alkyl group containing from 1 to about 30 carbon atoms, hydrogen, an alkoxy group, an alkenyl group, an aryl group, a cycloalkyl group, a cycloalkenyl group, an arylalkyl group, or an arylalkenyl group, and $R_1$ being an alkyl group containing from 1 to about 8 carbon atoms, a hydroxyalkyl group, or an alkoxyalkyl group; and wherein the siloxane has the general formula:

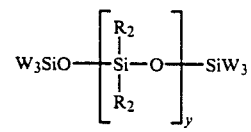

wherein $R_2$ is the same or different moiety of an alkyl containing from 1 to about 30 carbon atoms, an alkenyl containing up to about 8 carbon atoms, an aryl or a cycloalkyl, cycloalkenyl, arylalky or arylalkenyl wherein the cyclo substituent contains from about 4 to about 8 carbon atoms, the alkyl substituent contains from 1 to about 8 carbon atoms, the alkenyl substituent contains up to about 8 carbon atoms, and y is an integer of from 2 to about 100; and wherein W is a halogen, hydroxyl, alkyl, aryl or alkoxy.

2. The method of claim 1 wherein the step of mixing the water repellant composition with the water is defined further to include the steps of:
passing water repellant composition under pressure via a water repellant composition stream;
passing water in a water stream;
mixing the water with the water repellant composition under pressure for mixing the water repellant composition with the water to form the dispersion of water and water repellant composition; and
wherein the step of applying the dispersion to the structure is defined further to include the step of passing the dispersion of water repellant composition and water under pressure onto the structure to be treated.

3. The method of claim 1 defined further to include the step of:
applying a subsequent application of water repellant composition to the structure to be treated for increasing the depth of penetration.

4. The method of claim 1 wherein the step of mixing the water repellant composition with the water is defined further to include:
passing water under pressure via a water stream;
passing the water repellant composition into the water stream for mixing with the water; and
wherein the step of applying the dispersion to the structure is defined further to include the step:
passing the dispersion of water repellant composition and water under pressure onto the structure.

5. The method of claim 1 wherein the step of mixing the water repellant composition with the water is defined further to include the steps of:
passing water under pressure through a venturi-orfice;
passing the water repellant composition into the water in the venturi-orfice for mixing with the water to form the dispersion of water and water repellant composition; and
passing the dispersion of water repellant composition and water from the venturi-orfice to the structure to be treated.

6. The method of claim 5 defined further to include the step of:
passing the dispersion of water and water repellant composition through a spray nozzle, and the dispersion of water and water repellant composition from the spray nozzle being passed onto the structure to be treated.

7. The method of claim 5 defined further to include the step of:
metering the water repellant composition passed to the venturi-orfice for mixing a predetermined amount of water repellant composition with the water being passed through the venturi-orfice.

8. The method of claim 1 wherein the step of mixing the water repellant composition with water is defined further to include the steps of:
passing water in a water stream to a pump;
passing water repellant composition in a water repellant composition stream to the pump;
combining the water stream and the water repellant composition stream prior to or simultaneously with passing the water and the water repellant composition to the pump; and
passing the dispersion of water and water repellant composition to the pump;
pumping the dispersion of water and water repellant composition through a spray nozzle for spraying the dispersion of water and water repellant composition onto the structure to be treated.

9. The method of claim 8 defined further to include the step of:
metering the water in the water stream to provide a predetermined amount of water prior to mixing the water and the water repellant composition.

10. The method of claim 8 defined further to include the step of metering the water repellant composition prior to mixing the water and the water repellant composition for providing a predetermined amount of water repellant composition for mixing with the water.

11. A method for increasing the depth of penetration of a water repellant composition into a siliceous structure to be treated comprising the steps of:
applying the water repellant composition to the structure to be treated; and
applying a second application of the water repellant composition to the structure to be treated; and
wherein the water repellant composition is a silane having the general formula:

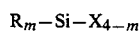

$$R_m-Si-X_{4-m}$$

wherein
m is 0 or 1 or 2 or 3;
X is a halogen, hydroxyl, R or $R_1$
R is an alkyl group containing from 1 to about 30 carbon atoms, hydrogen, an alkoxy group, an alkenyl group, an aryl group, a cycloalkyl group, a cycloalkenyl group, an arylalkyl group, or an arylalkenyl group, and $R_1$ being an alkyl group containing from 1 to about 8 carbon atoms, a hydroxyalkyl group, or an alkoxyalkyl group.

12. The method of claim 11 defined further to include the step of:
applying subsequent applications, after the second application of the water repellant to the structure to be treated.

13. The method of claim 11 wherein the step of applying the second application is defined further as applying the second application after permitting the structure to be treated to appear relatively dry.

14. The method of claim 1 defined further to include the step of:
applying subsequent applications of the water repellant composition to the structure to be treated for improving the treatments performance or appearance or for revitalizing the treatment's performance or appearance.

15. A method for treating siliceous and or carbon central structures at a site with a water repellant composition comprising the steps of:
mixing an effective amount of water repellant composition with water to obtain a dispersion of water and water repellant composition;
applying the dispersion of water repellant composition and water to the structure in a continuous process at the site for applying the water repellant composition to structure immediately within about 5 seconds after the water repellant composition and the water are mixed; and wherein the water repellant composition comprises a silane, and wherein the silane has the general formula:

$$R_m-Si-X_{4-m}$$

wherein
m is 0 or 1 or 2 or 3;
X is a halogen, hydroxyl, R or $R_1$;
R is an alkyl group containing from 1 to about 30 carbon atoms, hydrogen, an alkoxy group, an alkenyl group, an aryl group, a cycloalkyl group, a cycloalkenyl group, an arylalkyl group, or an arylalkenyl group, and $R_1$ being an alkyl group containing from 1 to about 8 carbon atoms, a hydroxyalkyl group, or an alkoxyalkyl group.

16. The method of claim 15 defined further to include the step of:
applying a subsequent application of water repellant composition to the structure to be treated for increasing the depth of penetration.

17. The method of claim 15 defined further to include the step of:
applying subsequent applications of the water repellant composition to the structure to be treated for improving the treatments performance or appearance or for revitalizing the treatment's performance or appearance.

18. The method of claim 15 wherein the step of mixing the water repellant composition with the water is defined further to include:
passing water under pressure via a water stream;
passing the water repellant composition into the water stream for mixing with the water; and
wherein the step of applying the dispersion to the structure is defined further to include the step:
passing the dispersion of water repellant composition and water under pressure onto the structure.

19. The method of claim 15 wherein the step of mixing the water repellant composition with the water is defined further to include the steps of:
passing water under pressure through a venturi-orfice;
passing the water repellant composition into the water in the venturi-orfice for mixing with the water to form the dispersion of water and water repellant composition; and
passing the dispersion of water repellant composition and water from the venturi-orfice to the structure to be treated.

20. The method of claim 19 defined further to include the step of:
passing the dispersion of water and water repellant composition through a spray nozzle, and the dispersion of water and water repellant composition from the spray nozzle being passed onto the structure to be treated.

21. The method of claim 19 defined further to include the step of:
metering the water repellant composition passed to the venturi-orfice for mixing a predetermined amount of water repellant composition with the water being passed through the venturi-orfice.

22. The method of claim 15 wherein the step of mixing the water repellant composition with water is defined further to include the steps of:
passing water in a water stream to a pump;
passing water repellant composition in a water repellant composition stream to the pump;
combining the water stream and the water repellant composition stream prior to or simultaneously with passing the water and the water repellant composition to the pump; and
passing the dispersion of water and water repellant composition to the pump;
pumping the dispersion of water and water repellant composition through a spray nozzle for spraying the dispersion of water and water repellant composition onto the structure to be treated.

23. The method of claim 22 defined further to include the step of:
metering the water in the water stream to provide a predetermined amount of water prior to mixing the water and the water repellant composition.

24. The method of claim 22 defined further to include the step of metering the water repellant composition prior to mixing the water and the water repellant composition for providing a predetermined amount of water repellant composition for mixing with the water.

25. The method of claim 15 wherein the step of mixing the water repellant composition with the water is defined further to include the steps of:
passing water repellant composition under pressure via a water repellant composition stream;
passing water in a water stream;
mixing the water with the water repellant composition under pressure for mixing the water repellant composition with the water to form the dispersion of water and water repellant composition; and
wherein the step of applying the dispersion to the structure is defined further to include the step of passing the dispersion of water repellant composition and water under pressure onto the structure to be treated.

26. A method for rendering normally water wettable objects or structures water repellant at a site with a water repellant composition comprising the steps of:
mixing an effective amount of water repellant composition with water to obtain a dispersion of water and water repellant composition and applying the dispersion of water repellant composition and water to the structure in a continuous process at the site immediately within about 5 seconds after the water repellant composition and the water are mixed.

27. The method of claim 26 wherein the step of mixing the water repellant composition with the water is defined further to include:
passing water under pressure via a water stream;
passing the water repellant composition into the water stream for mixing with the water; and
wherein the step of applying the dispersion to the structure is defined further to include the step:
passing the dispersion of water repellant composition and water under pressure onto the structure.

28. The method of claim 26 wherein the step of mixing the water repellant composition with the water is defined further to include the steps of:
passing water under pressure through a venturi-orfice;
passing the water repellant composition into the water in the venturi-orfice for mixing with the water to form the dispersion of water and water repellant composition; and passing the dispersion of water repellant composition and water from the venturi-orfice to the structure to be treated.

29. The method of claim 28 defined further to include the step of:
passing the dispersion of water and water repellant composition through a spray nozzle, and the dispersion of water and water repellant composition from the spray nozzle being passed onto the structure to be treated.

30. The method of claim 28 defined further to include the step of:
metering the water repellant composition passed to the venturi-orfice for mixing a predetermined amount of water repellant composition with the water being passed through the venturi-orfice.

31. The method of claim 28 wherein the step of mixing the water repellant composition with water is defined further to include the steps of:
passing water in a water stream to a pump;
passing water repellant composition in a water repellant composition stream to the pump;
combining the water stream and the water repellant composition stream prior to or simultaneously with passing the water and the water repellant composition to the pump; and
passing the dispersion of water and water repellant composition to the pump;
pumping the dispersion of water and water repellant composition through a spray nozzle for spraying the dispersion of water and water repellant composition onto the structure to be treated.

32. The method of claim 31 defined further to include the step of:
metering the water in the water stream to provide a predetermined amount of water prior to mixing the water and the water repellant composition.

33. The method of claim 31 defined further to include the step of metering the water repellant composition prior to mixing the water and the water repellant composition for providing a predetermined amount of water repellant composition for mixing with the water.

34. The method of claim 26 wherein the step of mixing the water repellant composition with the water is defined further to include the steps of:
passing water repellant composition under pressure via a water repellant composition stream;
passing water in a water stream;
mixing the water with the water repellant composition under pressure for mixing the water repellant composition with the water to form the dispersion of water and water repellant composition; and
wherein the step of applying the dispersion to the structure is defined further to include the step of passing the dispersion of water repellant composition and water under pressure onto the structure to be treated.

35. The method of claim 26 defined further to include the step of:
applying subsequent applications of the water repellant composition to the structure to be treated for improving the treatments performance or appearance or for revitalizing the treatment's performance or appearance.

36. A method for applying a water repellant composition to a structure to be treated using a garden hose connectable to a water outlet and a dispenser adapted to hold a quantity of the water repellant composition and being connectable to the garden hose for passing the water repellant composition into the water running through the garden hose comprising the steps of:
placing a quantity of the water repellant composition in the dispenser;
connecting the dispenser to the garden hose;
passing water through the garden hose so water repellant composition from the dispenser is mixed with the water to obtain a dispersion of water and water repellant composition; and
passing the dispersion from the garden hose and onto the structure to be treated immediately within about 5 seconds after the water repellant composition and the water are mixed.

37. The method of claim 36 wherein the water repellant composition comprises a silane having the general formula:

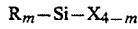

wherein
m is 0 or 1 or 2 or 3;
X is a halogen, hydroxyl, R or $R_1$
R is an alkyl group containing from 1 to about 30 carbon atoms, hydrogen, an alkoxy group, an alkenyl group, an aryl group, a cycloalkyl group, a cycloalkenyl group, an arylalkyl group, or an arylalkenyl group, and $R_1$ being an alkyl group containing from 1 to about 8 carbon atoms, a hydroxyalkyl group, or an alkoxyalkyl group.

38. The method of claim 36 wherein the water repellant composition comprises a siloxane having the general formula:

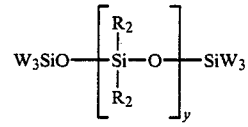

wherein $R_2$ is the same or different moiety of an alkyl containing from 1 to about 30 carbon.

* * * * *